Nov. 25, 1924.
W. E. McDONELL
1,517,216
OPHTHALMIC MOUNTING
Filed March 23, 1922
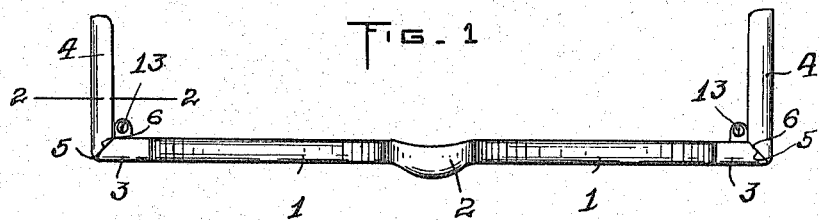
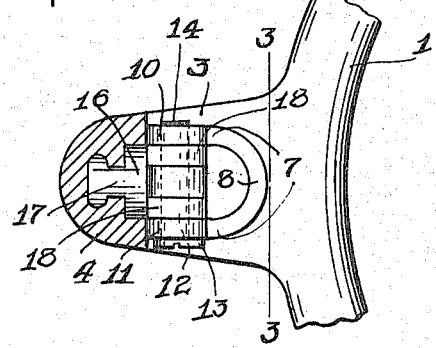
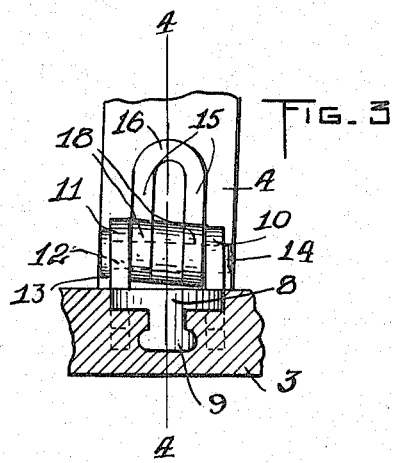
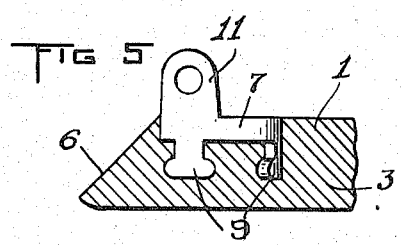
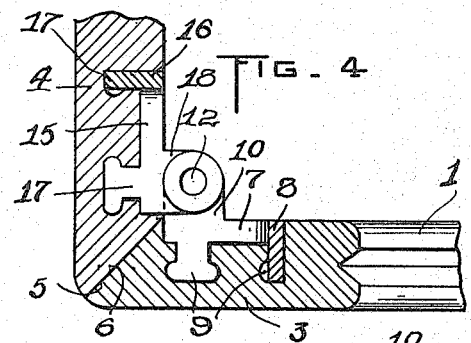
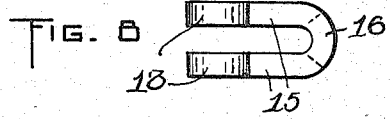
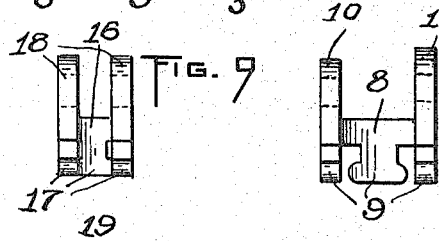
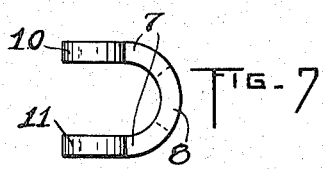
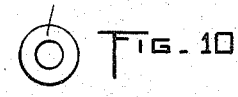
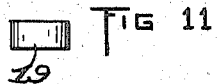
INVENTOR.
William E. McDonell
BY Davis & Timms
ATTORNEYS.

Patented Nov. 25, 1924.   1,517,216

UNITED STATES PATENT OFFICE.

WILLIAM E. McDONELL, OF ROCHESTER, NEW YORK, ASSIGNOR TO SHUR-ON OPTICAL COMPANY, INC., OF ROCHESTER, NEW YORK, A CORPORATION OF NEW YORK.

OPHTHALMIC MOUNTING.

Application filed March 23, 1922. Serial No. 546,139.

*To all whom it may concern:*

Be it known that I, WILLIAM E. McDONELL, a citizen of the United States, and resident of Rochester, in the county of Monroe and State of New York, have invented certain new and useful Improvements in Ophthalmic Mountings, of which the following is a specification.

The present invention relates to ophthalmic mountings and more particularly to the type made from zylonite or similar non-metallic material. An object of this invention is to provide an improved manner of connecting the temples to the frame which carries the lenses, this connecting means being effectively secured to each temple and the frame and being inconspicuous when viewed from the front of the mounting. A further object of the invention is to provide a construction in which the hinges between the temples and the frame may be tightened to prevent loose play of the temples on the frame carrying the lenses. Still another object of the invention is to provide an improved hinge member which may be effectively embedded in a non-metallic lens frame or temple so as not to become readily disconnected from such part.

To these and other ends, the invention consists of certain parts and combinations of parts, all of which will be hereinafter described: the novel features being pointed out in the appended claims.

In the drawings:

Fig. 1 is a top view of an ophthalmic mounting constructed in accordance with this invention, the temples being broken away;

Fig. 2 is an enlarged and fragmentary section on the line 2—2, Fig. 1;

Fig. 3 is a section on the line 3—3, Fig. 2;

Fig. 4 is a section on the line 4—4, Fig. 3;

Fig. 5 is a sectional view through the frame showing the hinge member thereof in side elevation;

Fig. 6 is an end view of the hinge member that connects with the lens frame;

Fig. 7 is a plan view of the hinge member that connects with the lens frame;

Fig. 8 is a plan view of the hinge member that connects with the temple;

Fig. 9 is an end view of the hinge member that connects with the temple; and

Figs. 10 and 11 are, respectively, plan and side views of the washer interposed between the ears of the temple hinge member.

In the illustrated embodiment of the drawings, there is employed a frame formed of non-metallic material, such as zylonite, and provided with two lens rings 1 connected by a bridging portion 2, each ring 1 preferably having at its outer edge a projection or extension 3 to which the temples 4 are pivotally connected, the temples being provided at their ends with bevelled portions 5 which cooperate with bevelled portions 6 on the extension 3 to limit the outward swinging of the temples.

The hinge connection, in this embodiment employs two members, one embedded in the frame and the other in the temple. The one embedded in the frame embodies a U-shaped piece providing two arms 7 connected by a resilient bend 8. On one side of the said U shaped portion three anchoring lugs 9 may be provided. These lugs, in this instance, have enlarged ends and are arranged, one at the bend 8 and the other two at the outer ends of the arms 7. On the other sides of the arms 7, ears 10 and 11 are provided, one of these ears being longer than the other, so that the pivot pin 12 which connects the ears may lie with its axis at an angle to the plane of the frame in order that the frame may lie in a vertical position on the face. The pivot pin 12 has a head 13 engaging the outer face of the lug 11 and a screw threaded portion 14 engaging in the lug or ear 10. In attaching the hinge member to the lens frame, the hinge member is heated and, while in a heated condition, is forced into the rear face of the zylonite or non-metallic extension 3 so that the ends of the arms 7 lie in immediate proximity to the bevel 6, the U-shaped portion 8 being also embedded within the material so that its upper face is flush with the rear face of the frame. Owing to the fact, that the arms 7 are connected by the U-shaped bend 8 and have the resilient zylonite between them, it is possible by the screw pivot 12 to draw the ears 10 and 11 together in order to produce a binding action on the hinge member operating between the ears 10 and 11.

The hinge member secured to each temple 4 is also in the form of two arms indicated at 15 and connected by a bend 16. The U-shaped portion, thus formed, has on one side anchoring projections 17 with enlarged heads, one projection being at the bend and the other two being at the free ends of the arms. The outer faces of the arms are provided with perforated ears 18. The U-shaped portion with the headed anchoring projections 17 is embedded in the temple, as shown in Fig. 4, so that the ends of the arms 15 will be positioned substantially at the inner edge of the bevelled portion 5. The ears 18 are received between the ears 10 and 11 and a ring or washer 19 is fitted between the ears about the pin and serves to prevent distortion of the temple hinge member when pressure is placed thereon by the screw 12.

From the foregoing it will be seen that there has been provided an improved ophthalmic mounting in which the temples are connected to the lens frame extensions through hinge members which are embedded in the temples and the lens frame extension. These hinge members embody U-shaped portions embedded in the parts to which they are attached and having ears on the ends of their arms through which the pivot pins extend. The U-shaped portions also each have headed anchoring projections extending from the connecting portion between the arms and also from the arms near the ends thereof. There has also been provided a hinge construction in which the pivot ears are mounted on arms, resiliently connected together, thus permitting the ears to be moved toward each other under the action of the pivot screw to produce a binding action on the hinge member between such ears.

It will be noted that the U-shaped member has its ears nearer one end thereof than the other and that the anchoring projections are arranged at opposite ends of this member, one of the projections being nearer the ears than the other. By this arrangement the strain on the anchoring projections is so distributed that the possibility of the hinge member being disconnected from the non-metallic part is reduced to a minimum.

What I claim as my invention and desire to secure by Letters Patent is:

1. In combination with a part made from non-metallic material, a hinge member having two ears, and a U-shaped portion from the sides of the arms of which said ears extend parallel with said arms, said U-shaped portion being embedded in the non-metallic material.

2. In combination with a part made of non-metallic material, a U-shaped portion embedded in said material and having anchoring projections extending from the arms thereof and also from the connecting portion between the arms and pivot ears extending from the opposite sides of said arms.

3. In combination with two parts, at least one of which is made of non-metallic material, a hinge connection between the parts embodying a hinge member connected to a part made of non-metallic material, said hinge member embodying two arms resiliently connected together and embedded in the material and also embodying two ears extending from said arms, a hinge member on the other part received by the said ears, and a pivot pin connecting said ears to produce a binding action on the hinge member between the ears.

4. In combination with two parts, at least one of which is made of non-metallic material, a hinge connection between the members embodying a member having two ears and a resilient connection between the ears, said hinge connection also embodying a member on the other part received between the ears, and a pin connecting the ears to produce binding action on the hinge member received between the ears.

5. The combination with a lens frame of non-metallic material provided with extensions at opposite sides, each of said extensions having a bevelled end portion and temples of non-metallic material having bevelled ends for cooperation with the bevelled ends of the extensions, of hinges connecting the temples to the lens frame, each hinge embodying two members, each member having a U-shaped portion embedded in the non-metallic material of the part by which it is carried, so that the face thereof is flush with such part, the free ends of the arms of said U-shaped portion being adjacent the bevelled portion of the part, and ears carried by said arms near their free ends and pivotally connected to the ears on the other hinge member.

6. The combination with two parts made of non-metallic material and each having cooperating bevelled portions, a hinge connecting said parts embodying two hinge members, each formed with two connecting arms embedded in the non-metallic material, and ears extending from said arms and pivotally connected to the ears on the other hinge member.

7. The combination, in an ophthalmic mounting, of a non-metallic lens frame having a projection extending outwardly therefrom, and a temple, of a hinge connection between the temple and the projection embodying a member embedded in the rear face of the projection and having anchoring projections extending into said lens frame and formed with shoulders, the face of the member being substantially flush with the rear face of the extension on the lens frame and the member having ears extending beyond said face to which the temple is hinged.

8. The combination, in an ophthalmic mounting, of a non-metallic lens frame having a projection formed with a bevelled end, and a temple having its inner end formed of non-metallic material and bevelled, of a hinge connection between the temple and the frame projection, embodying two members one secured to the temple and the other to the frame projection and each having a body portion embedded in the part of the mounting to which it is secured, the face of each member being flush with the face of the part in which it is embedded and each member having ears extending from such face and pivoted to the ears of the other member, and anchoring projections on said member embedded in the material to which the member is secured, said anchoring projection being formed with shoulders.

9. The combination, in an ophthalmic mounting, with a non-metallic lens frame having a projection at one side and a bevelled portion on said projection and a temple having an inner end formed of non-metallic material and bevelled to cooperate with the bevelled portion on the projection, of a hinge connection between the temple and the projection of the lens frame embodying two members, one secured on the inner side of the temple and the other secured on the rear face of the projection, each of said members having two ears projecting therefrom and pivotally connected to the ears of the other member and each of said members extending to one side of the ears and having an anchoring projection adjacent the ears, and an anchoring projection on that end farthest removed from the ears.

WILLIAM E. McDONELL.